Feb. 13, 1945. G. H. FRANK ET AL 2,369,291
MOLDING
Filed Sept. 29, 1942 4 Sheets-Sheet 4
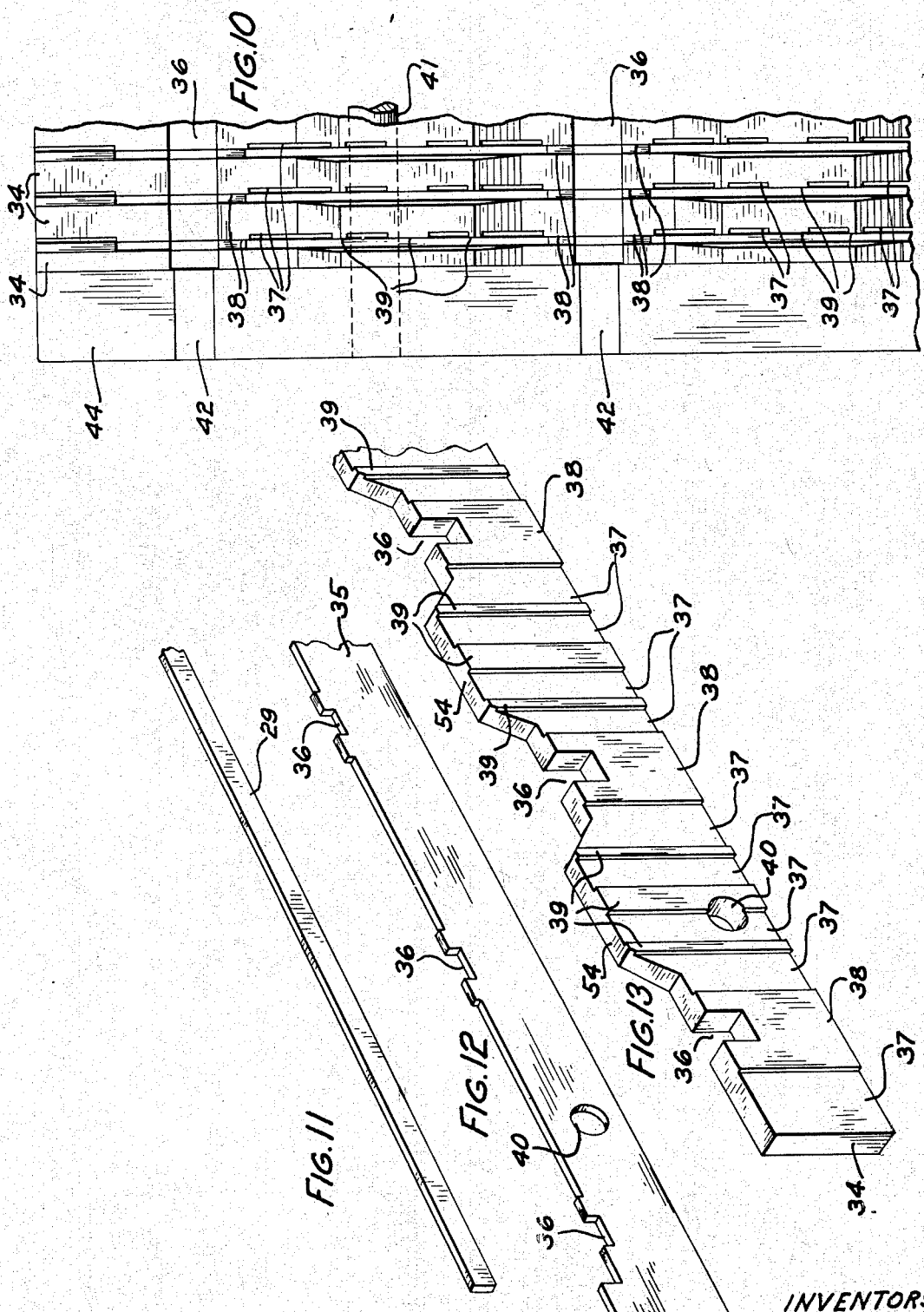
INVENTORS
G. H. FRANK
B. M. A. TREBES
BY Harry L. Duft
ATTORNEY Patented Feb. 13, 1945

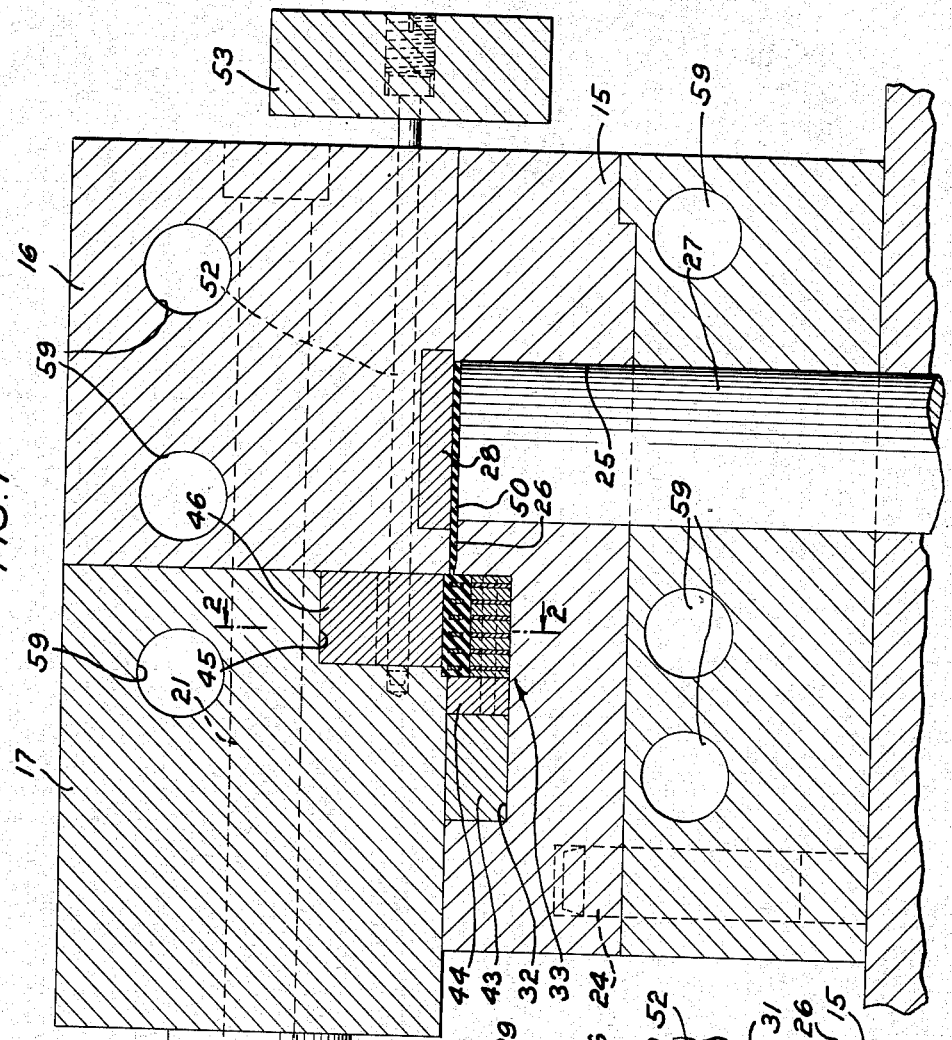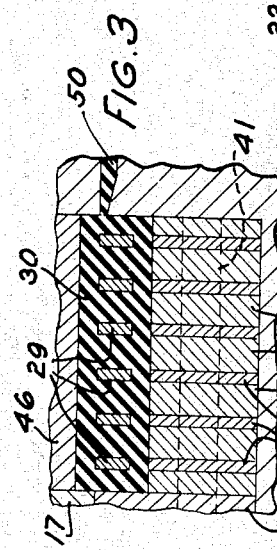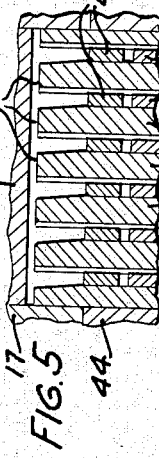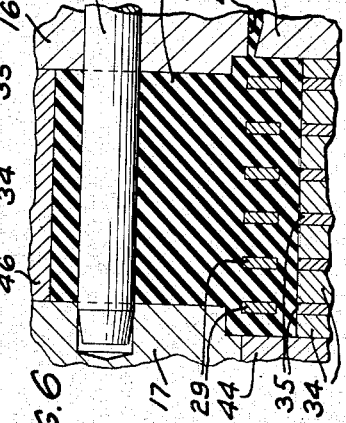

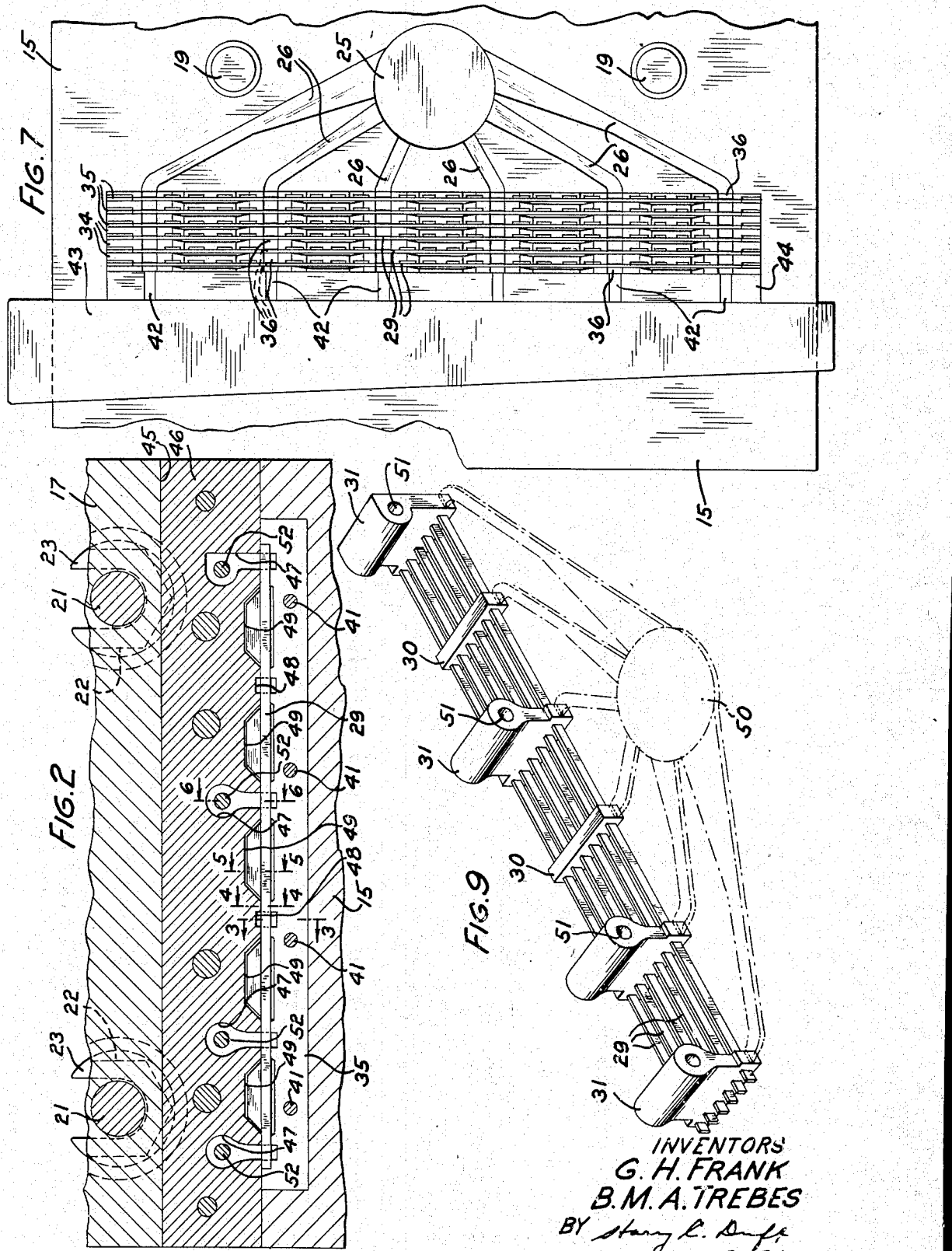

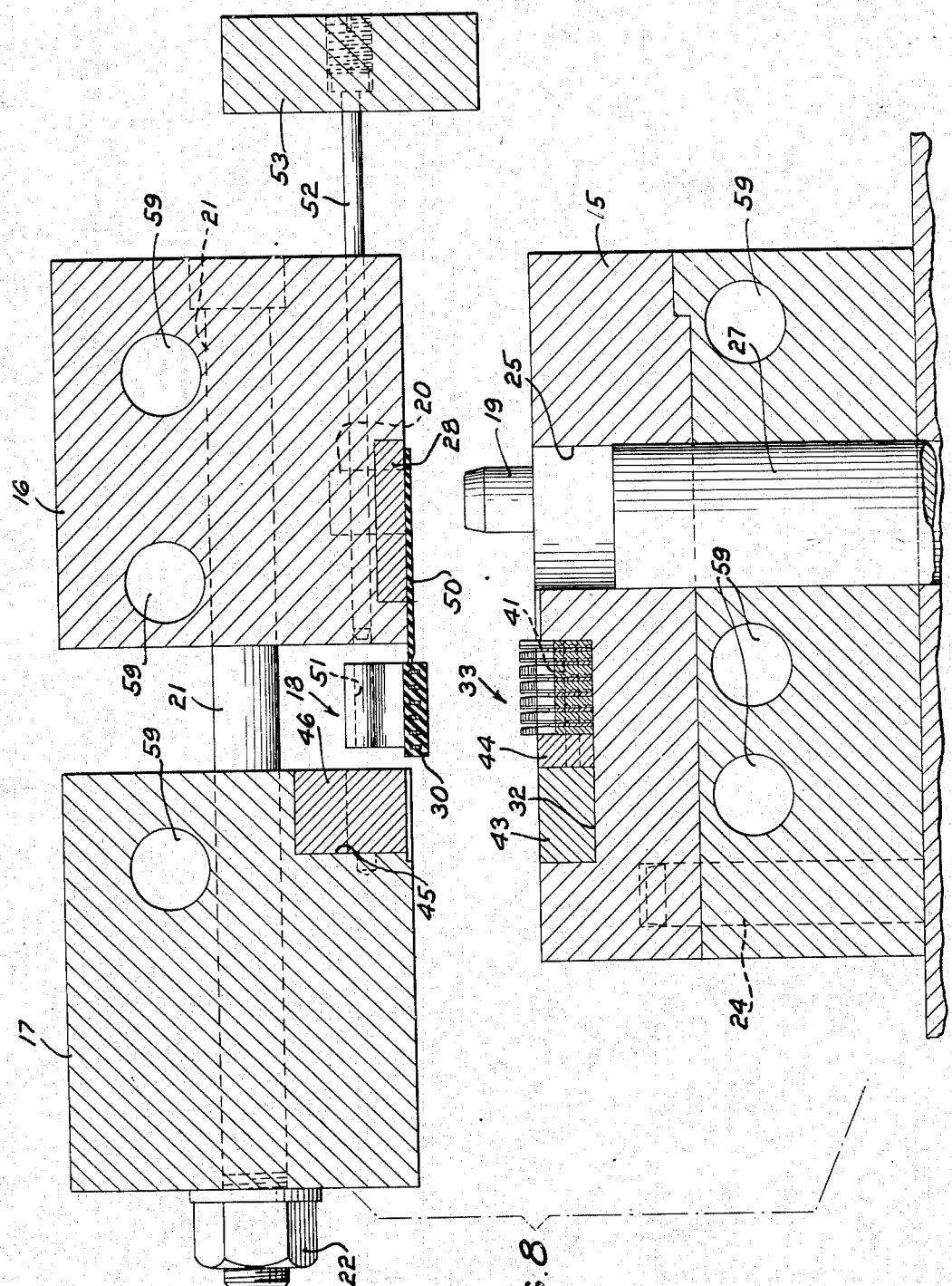

2,369,291

UNITED STATES PATENT OFFICE 2,369,291

MOLDING

George H. Frank, Oak Park, and Bruno M. A. Trebes, Berwyn, Ill., assignors to Western Electric Company, Incorporated, New York N. Y., a corporation of New York Application September 29, 1942, Serial No. 460,065

5 Claims. (Cl. 18—36)

This invention relates to a method of and apparatus for molding and more particularly to a method and apparatus for injection molding an assembly of parts.

It is an object of the present invention to provide an effective and efficient apparatus for injection molding an assembly of parts.

In accordance with one embodiment of this invention, an injection molding apparatus may be provided comprising a sectional die, one section of which is provided with a cylindrical extrusion chamber for receiving molding compound. A rectangular recessed portion is provided adjacent this chamber and a laminated insert holder is positioned therein. A wedge is also positioned in said recess to force the laminations together. Another section of the die is provided with a number of cavities so positioned and shaped that when these two sections are brought together, a number of enclosed mold cavities are formed at points on the insert holder. A corresponding number of ribbon shaped runners extend radially from the extrusion chamber to each cavity. A third section of the die is positioned adjacent these sections and facilitates proper positioning thereof.

Other objects and advantages of this invention will be apparent from the following detailed description taken in conjunction with the following drawings, wherein:

Fig. 1 is a fragmentary sectional view of an injection molding apparatus;

Fig. 2 is a vertical sectional view along the line 2—2 of Fig. 1;

Fig. 3 is a vertical sectional view along the line 3—3 of Fig. 2;

Fig. 4 is a vertical sectional view along the line 4—4 of Fig. 2;

Fig. 5 is a vertical sectional view along the line 5—5 of Fig. 2;

Fig. 6 is a vertical sectional view along the line 6—6 of Fig. 2;

Fig. 7 is a fragmentary plan view of the lower section of the molding die;

Fig. 8 is a sectional view of the molding apparatus, the several sections of the molding die being shown apart;

Fig. 9 is a perspective view of the molded article produced by this apparatus;

Fig. 10 is a fragmentary enlarged plan view of the laminated insert holder and an insert;

Fig. 11 is a fragmentary perspective view of the insert;

Fig. 12 is a fragmentary perspective view of a spacer used in the work holder, and Fig. 13 is a fragmentary perspective view of a plate used in the work holder.

In molding thermosetting materials, it is desirable that the molding compound be uniformly and completely plastified prior to injection into the molding cavity. Incomplete curing of the compound or portions thereof may result in a defect in the final molded article. In the present apparatus, complete heating and curing of the molding compound is effected by the use of a number of ribbon-like extrusion apertures which extend laterally from the bottom of the cylinder to the molding cavity. By extruding the material through orifices of this shape, the material is spread out and a large surface area of the material exposed to the heated surface of the die.

Referring now to the drawings, in Fig. 1 a molding die constructed in accordance with this invention is shown comprising a lower section 15 and two upper sections 16 and 17. As may be seen in Fig. 8, the three sections may be separated to permit removal of a molded assembly 18. In order to position the several sections properly with respect to each other when the die is closed, a pair of dowel pins 19 is provided in the upper surface of the lower section 15. These dowel pins fit closely into a corresponding pair of apertures 20 in the lower surface of upper section 16 of the die. The two upper sections are held together by a pair of threaded bolts 21. These bolts extend through sections 16 and 17 and are provided with nuts 22 and large spacer members 23. The lower section 15 of the molding die is made, as a matter of expediency, in two sections which are held in position by a number of dowel pins 24 as shown in Figs. 1 and 8.

A cylindrical extrusion chamber 25 is formed in the lower section 15 to receive molding material. At the extrusion end of this chamber 25, a number of ribbon-like orifices or runners 26, as shown in Fig. 7, are formed in the surface of the section 15 and are shaped so as to cause the molding material, as it is extruded, to form a ribbon. In this way, a maximum amount of heat reaches a maximum area of molding material, thus promoting uniformity of heat treatment. Thus, when the material reaches the mold cavities, the heat treatment is then largely completed. As may be seen in Fig. 7, these outlets are of varying cross section, the largest being used where the molding material is required to travel farthest. This difference in size is required to enable the material to reach all sections of the die cavity at substantially the same time and under substantially the same pressure.

This apparatus is intended to produce an assembly 18 comprising a plurality of conducting strips 29 held in spaced parallel relation by a number of blocks 30 and 31 of insulating material molded around selected areas of the strips as shown in Fig. 9. The particular assembly there shown is intended to be used in a cross bar switch mechanism such as used in certain types of telephone apparatus. It is particularly important that the molded assembly be free from projecting particles or flash which might drop into the mechanism or otherwise interfere with the operation of the apparatus. In order to mold the material in the several areas and in the several shapes shown in a single operation, while at the same time confining the molding material to the precise areas desired, a complicated interior die structure is resorted to.

Referring to Figs. 7 and 8, it will be there seen that the lower die section 15 has a recessed portion 32 to the left of the extrusion chamber 25. An insert holder 33 comprising a plurality of plates 34 spaced from each other by smaller plates 35 of substantially the same thickness as the conducting strips 29 is positioned in this recessed portion. In use, these strips are pressed between the plates 34 and rest on the upper surface of plates 35 as shown in Figs. 2, 5 and 10. The plates are clamped together by a wedge 43 and a buffer bar 44 separates the plates from the wedge to prevent damage to the plates. In order to prevent molding material from escaping from the molding areas, the lower portion of which is formed by cut out portions 36 formed in both sets of plates, the effective clamping pressure may be substantially increased in areas 38 adjacent these cut out portions by providing recessed portions 37 in one side of each of plates 34 at intervals between the areas 38 where maximum contact and clamping pressure is desired. In this way, the contact pressure is concentrated in the areas where it is required. A continuous recessed portion between the clamping areas is not desirable, however, because the plates may tend to warp under pressure unless properly supported and thus, at spaced intervals along the recessed portions 37, small raised areas 39 are permitted to remain. However, it will be apparent that if a reduction in contact area of 50% is made, an increase in contact pressure, for a given wedging pressure, of 100% is obtained. If even more clamping is required to confine molding material to the molding areas than may be obtained by configuring the plates 34 as just described, the clamping areas 38 may be made slightly higher than the supporting areas 39 and thus, as the plates are wedged together, the contact areas will tend to bite into the conducting strips 29.

A number of small apertures 40 are formed in each of the plates, and aligning rods 41 may be inserted therein to position the plates properly with respect to each other. It will be seen in Fig. 7 that the radially extending runners 26 communicate with each of the molding cavities formed by the cut out portions 36 in the plates 34 and 35. Exhaust grooves or vents 42 are formed in the upper surface of the buffer bar 44 communicating with the molding cavities so formed to permit air and gas to escape as the molding material is injected into the cavities. These grooves are relatively shallow, being approximately .001" deep.

Die section 17 is also provided with a recessed portion 45 at the lower right hand corner and a block 46, having a number of large cavities 47 and several smaller cavities 48 formed therein, is positioned in this recessed portion and fixed to the die section 17, as shown in Figs. 1, 2, 7 and 8. The smaller cavities 48 form the small insert insulating and spacing blocks 30, while the larger cavities 47 form the larger blocks 31 as shown in Fig. 2. The lower surface of block 17 is recessed in several places 49 to permit tapered projecting portions 54 of the plates 34 to extend therein without touching the block when the three die sections are joined together. These portions 54 are provided to facilitate positioning the strips between the plates. The recessed portions 36 of the plates 34 and 35 cooperate with the cavities 47 in the block 46 to form a number of enclosed mold cavities, as shown in Fig. 2, a runner 26 extending from the chamber 25 to each of these cavities.

As may be seen in Fig. 9, the insulating blocks 31 have apertures 51 formed through the upper portion thereof. These apertures are formed during molding by a number of rods 52 which are slidably supported in the block 16 and are extensible into the large cavities 47 in the block 46. These rods are mounted on a heavy block 53 to facilitate withdrawal as shown in Figs. 1 and 8.

Figs. 3 to 6, in a number of sectional views taken progressively at a number of points along the holder 33 and sections 15 and 17, the sections being joined together and the holder being clamped in position in the recessed portion of the section 15 as shown in Fig. 1, illustrate how the small blocks 30 and large blocks 31 are formed on the strips 29. The small block 30 and the strips 29 may be seen in Fig. 3. The projecting portions of the large plates 34 extend into the recessed portions 49 in the bottom of the block 46 as shown in Fig. 5, the strips 29 being shown between the plates 34 in Figs. 3 and 4. The large cavity 47 used in forming the large blocks 31, and the rod 52 which forms the aperture 51 through the upper portion of this block are shown in molding position in Fig. 6. The several sections of the die are heated through a number of tubular apertures 59 formed therein. Steam may be circulated through these apertures or electrical heating elements inserted therein.

In the operation of this device, the three sections of the die are clamped together by any suitable means, the molding material is positioned in the chamber 25 and a ram 27 actuated to extrude the material through the radially extending outlets 26 to inject it into the several mold cavities. By employing ribbon shaped runners, the speed and uniformity of heating of the molding material is substantially increased. An extrusion pressure should be selected which will be sufficient to inject the molding material into the mold cavities after the material is completely plasticized, but before polymerization of the material is sufficiently advanced to cause it to set in the runners.

In order to prevent scoring at the base of the extrusion chamber as molding material is extruded, an insert 28 of specially hardened metal is positioned in the surface of section 16 forming the base of the extrusion chamber, as shown in Figs. 1 and 8. After the material has cured in the heated mold cavities sufficiently, the wedge 43 is removed, thus loosening the plates of the holder 33. The sections 16 and 17 are then lifted away from the section 15 or the section 15 lowered from sections 16 and 17, the molded assembly 18 of parts remaining attached to die section 17 because of the shape of the cavities in the block 46. The operator then withdraws the rods 52 and loosens the nuts 22 sufficiently to permit removal of the spacer members 23 and then pulls the section 17 away from the section 16 a sufficient distance to permit removal of the assembly from the block 46. A sprue portion 50 of the assembly may then be broken off.

While but one embodiment of this invention has been shown and described, it will be understood that many changes and modifications may be made therein without departing from the spirit and scope of the present invention.

What is claimed is:

1. A molding apparatus having a sectional die, a recessed portion in one of said sections, a laminated insert holder in said recessed portion, a wedge in said recessed portion adjacent said laminated insert holder for clamping said laminations together, another section having a recessed portion therein, a block in said recessed portion, said block being provided with a plurality of cavities, said cavities and said laminated insert holder cooperating with said die holders and positioned together to form a number of separate mold cavities, an extrusion chamber in one of said sections, and a number of outlets leading from said chamber to each of said cavities.

2. A molding apparatus having a sectional die, a recessed portion in one of said sections, a laminated insert holder in said recessed portion, said holder comprising a plurality of plates, some of said plates acting as spacers for the other plates, said holder being designed to receive an insert, a wedge adjacent said holder for clamping said plates together to engage said insert, another section having a recessed portion therein, a block in said recessed portion, said block being provided with a plurality of cavities, said cavities and said laminated insert holder cooperating with said die holders and positioned together to form a number of separate mold cavties, an extrusion chamber in one of said sections, and a number of outlets leading from said chamber to each of said cavities.

3. In a molding apparatus, a work holder comprising a plurality of plates, said plates cooperating to form parts of a number of mold cavities, means for clamping said plates together, raised portions formed in the areas adjacent said mold cavities on some of said plates to concentrate the clamping force in those areas, and reenforcing raised portions formed on said plates in the areas between said clamping raised portions, said reinforcing raised portions being slightly lower than said clamping raised portions.

4. A molding die having an extrusion chamber for receiving molding material, an elongated molding cavity, and a plurality of ribbon-like outlets extending from said chamber to said cavity, said outlets being of substantially the same depth but of varying width and length, the longer outlets having portions of greater width than the corresponding portions of the shorter outlets, said wider portions being adjacent the extrusion chamber.

5. In a molding apparatus, a sectional die, an extrusion chamber in one of said sections for receiving molding compound, one of said sections having a recess formed therein, a laminated insert holder in said recess, another of said sections having a plurality of cavities formed therein spaced at varying distances from said extrusion chamber, said cavities and said holder cooperating to form a plurality of molding chambers, and a plurality of ribbon-like outlets extending from said extrusion chamber to said molding chambers, said outlets being of substantially the same depth but of varying width and length, the longer outlets having portions of greater width than the corresponding portions of the shorter outlets, said wider portions being adjacent the extrusion chamber.

GEORGE H. FRANK.
BRUNO M. A. TREBES.